(12) United States Patent
Swanburg et al.

(10) Patent No.: US 8,019,683 B1
(45) Date of Patent: Sep. 13, 2011

(54) INTELLIGENT CHARGING FOR SERVICES

(75) Inventors: Scott Allen Swanburg, Duluth, GA (US); Gurmeet Kaur Bhatia, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 11/934,164

(22) Filed: Nov. 2, 2007

(51) Int. Cl.
*G06Q 40/00* (2006.01)
*H04L 12/16* (2006.01)
*H04M 11/00* (2006.01)
*H04M 3/00* (2006.01)
*G06F 15/16* (2006.01)
*H04N 7/173* (2006.01)

(52) U.S. Cl. .................... 705/40; 370/259; 379/201.05; 455/406; 455/418; 709/227; 725/116

(58) Field of Classification Search .................. 370/259; 379/201.05; 455/418, 406; 709/227; 725/116
See application file for complete search history.

(56) References Cited

U.S. PATENT DOCUMENTS

| | | | | |
|---|---|---|---|---|
| 5,559,877 A | * | 9/1996 | Ash et al. | 379/201.05 |
| 6,044,264 A | * | 3/2000 | Huotari et al. | 455/414.1 |
| 6,349,093 B1 | * | 2/2002 | Caldwell et al. | 370/259 |
| 6,470,179 B1 | * | 10/2002 | Chow et al. | 455/406 |
| 6,952,836 B1 | * | 10/2005 | Donlan et al. | 725/116 |
| 7,145,996 B2 | * | 12/2006 | Creamer et al. | 379/201.02 |
| 7,627,679 B1 | * | 12/2009 | Bowen et al. | 709/227 |
| 2002/0090932 A1 | * | 7/2002 | Bhatia et al. | 455/412 |
| 2002/0120519 A1 | * | 8/2002 | Martin et al. | 705/21 |
| 2004/0137890 A1 | * | 7/2004 | Kalke | 455/418 |
| 2005/0105467 A1 | * | 5/2005 | True et al. | 370/235 |
| 2005/0130624 A1 | * | 6/2005 | Batni et al. | 455/406 |
| 2005/0267817 A1 | * | 12/2005 | Barton et al. | 705/26 |
| 2006/0234686 A1 | * | 10/2006 | Grassiotto | 455/414.1 |
| 2006/0253693 A1 | * | 11/2006 | Kanodia | 713/1 |

* cited by examiner

*Primary Examiner* — Shahid R Merchant
*Assistant Examiner* — William Rankins
(74) *Attorney, Agent, or Firm* — Moazzam & Associates, LLC

(57) ABSTRACT

The present invention discloses systems and methods for intelligently providing and charging for services on a network. A Service Controller aggregates usage history for a subscriber using a service on a network. An IICR consolidates the information into a subscriber profile and links the subscriber profile to community profiles or "segmentation" profiles. The Service Controller then seeks patterns in the subscriber profile, and adjusts the level of service for the subscriber based on said patterns. Services are dynamically provisioned and de-provisioned in real-time based on the subscriber's usage of the services, along with demographics and network conditions. Additionally, the subscriber is charged for the services based on his real-time use of the services and based on the Quality of Service (QoS) actually delivered.

11 Claims, 3 Drawing Sheets

INTELLIGENT CHARGING FOR SERVICES

BACKGROUND OF THE INVENTION

1. Field of the Invention

The present invention relates generally to telecommunications networks. More particularly, the present invention relates to billing subscribers for services on a network.

2. Background of the Invention

With increasing services available on a variety of interconnected networks, network operators are under pressure to provide greater connectivity to hosts of these services, such as the Internet and other data networks. This plethora of services like web browsing, real-time news and information, and multimedia content, revolves around sophisticated, interactive applications requiring quick and easy access, as well as allowing interconnectivity between services. In addition, there is increasing bandwidth available to subscribers at lower costs, as well as recent improvements in server technology and communication utilizing the packet-based IP Multimedia System (IMS) and Session Initiation Protocol (SIP). Clearly, the fusion between IP networks and mobile networks is under way.

However, network operators today continue to grapple with the issues inherent to this converged services architecture. This is especially true when it comes to controlling customer management, which includes provisioning services, billing for services, and customer care after a service has been delivered. Current customer management models are operator-centric, e.g., complex applications have been developed to ease the burden of the Information Technology groups within the operator with no view from the customer. In seeking to solve the problem of mass data collection and dissemination for their own purposes, network operators tend to lose focus on the subscriber's needs or demands. Service providers and network operators may monitor a subscriber's usage of a service, and may use this information in their application development. However, subscribers rarely directly benefit from this information collection. Where the ability exists for an application server to monitor and record details of usage for a particular application, subscribers are still limited in their ability and flexibility to launch applications and services at will. Currently a subscriber can enable or "provision" a new service or application through talking directly with the network operator, from the internet or perhaps from the mobile device itself. However, there is usually a lag time between the request for the new application or service and when the request is fulfilled.

Furthermore, the service and application are usually not optimized for the subscriber's needs. For instance, a data connection having a high upload bandwidth may not be optimal for a subscriber who regularly watches streaming TV. However, it may be optimal for a business user who sends attachments via email or live video via teleconference. Subscribers are not given the opportunity to optimize those services based on embedded network operator intelligence and are constantly pushed services and applications that may not meet their desires nor are optimize for their intended use. Finally, subscribers are often dissatisfied with their billing statements. A subscriber may complain about being charged for an expected level of service when a lower level of service was actually delivered. For instance, an audio podcast may be faulty or contain static, and the subscriber will still be billed for the multimedia.

Such disconnect between subscribers and service providers can be blamed on the lack of communication between network elements such as provisioning mechanisms and billing servers. The bottom line in the business model for most network operators is the revenue generated per subscriber on the network, or Average Revenue Per User (ARPU). Revenue is generated when a subscriber requests a specific service from an operator, such as a voice or data plan on a mobile device, and agrees to pay a certain amount for that service. Despite steady convergence in protocols and technologies, such as the IP Multimedia System (IMS), network operators are still using archaic network structures and have yet to tap into the potential of running a modular set of provisioning, application, billing, and QoS mechanisms. This lowers the ARPU, subscriber satisfaction, and network interoperability. With greater potential for offering several services and levels of services, what is needed is a system or method that overcomes long latency in application provisioning to keep subscribers happy while maintaining a normal level of revenue per subscriber.

SUMMARY OF THE INVENTION

The present invention discloses systems and methods for intelligently providing and charging for services on a network. A logic unit acting as a Service Controller monitors and aggregates usage history for a subscriber using a service on a network. A plurality of databases stores the usage history, and forwards it to an Intelligent Information Collection Repository (IICR). The IICR consolidates the information, combines it with a plurality of demographics for the subscriber along with other network information in a subscriber profile. The Service Controller then seeks patterns in the subscriber profile, and adjusts the level of service for the subscriber based on the patterns. Services are dynamically provisioned and de-provisioned in real-time based on the subscriber's usage of the services, along with demographics and network conditions. Additionally, the subscriber is charged for the services based on his real-time use of the services and based on the Quality of Service (QoS) actually delivered. This is all made possible by effectively managing the subscriber's usage data into several databases.

In one exemplary embodiment, the present invention is a method for intelligently charging a subscriber based on the QoS delivered. A Service Controller dynamically updates a subscriber's service level agreement (SLA) to reflect the subscriber's state at the time the service was used or delivered to the subscriber's device. Any discrepancies in QoS delivered versus QoS expected in the SLA are reflected in a Billing Controller, and subsequently in the subscriber's bill. Thus the subscriber is compensated for lower-quality services.

In another exemplary embodiment, the present invention is a network system for intelligent provisioning and charging a subscriber for services on a network. A Service Controller comprising a plurality of sub-controllers with databases aggregates usage information, which is compiled into a subscriber database in an IICR. Based on usage patterns in the subscriber profile as well as a segmentation profile, the Service Controller enables or disables services for the subscriber by modifying the subscriber's SLA or by prompting the subscriber for confirmation.

In another exemplary embodiment, the present invention starts with the experience of a subscriber across multiple applications and services. A Service Controller provides the subscriber with a software enabled environment to enable the subscriber to access, integrate and intelligently combine applications and services which were "price point" optimized for his/her usage. The optimum system would operate on behalf of the consumer and business user to provide a higher level of service and not encumber the user through complexity.

In another exemplary embodiment, the present invention is a method and system to charge third parties to provide relevant content to a network operator's subscribers. Based on a segment profile for a plurality of subscribers, a third party could target the segment to provide media, offers, and other content relevant to the segment. The network operator could charge the third party to host their content, while maintaining customer satisfaction and revenue.

DETAILED DESCRIPTION OF THE INVENTION

The present invention discloses systems and methods for intelligent provisioning and charging for services offered to a subscriber on a network. A logic unit on the network acts as an arbitrator or "service controller" between a subscriber's device and services on the network. The service controller aggregates information about a subscriber's usage of a service or an application, and stores the information in a plurality of databases. This information may include details regarding the content accessed by the subscriber, communications made by the subscriber, and billing information for the services used by the subscriber. The service controller is also in communication with an Intelligent Information Collection Repository (IICR). The IICR stores the aggregated usage history along with subscriber demographics and other information in a subscriber profile. Since the IICR contains consolidated profiles for multiple subscribers on the network, the IICR may also form "segment" profiles correlating subscribers having similar usage patterns. Additionally, a micro-level IICR (M-IICR) on the subscriber's device may collect usage data locally and submit this data to the arbitrator and the IICR.

Figure 1:
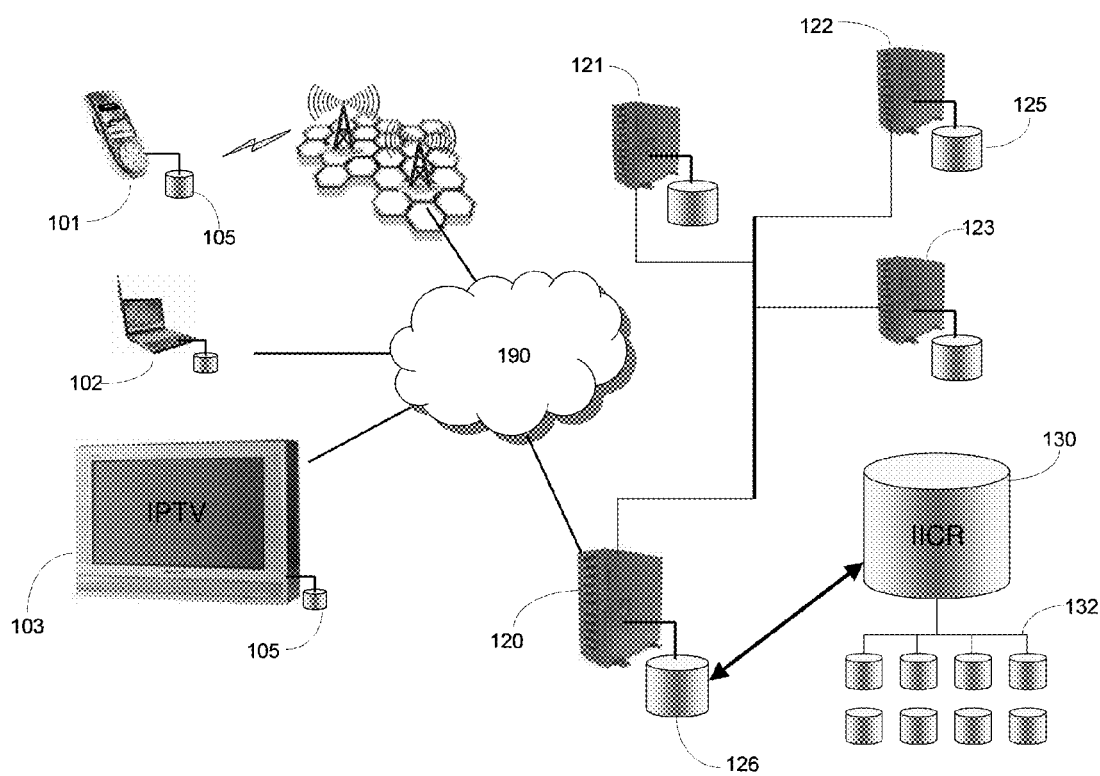
FIG. 1 shows a service controller within an IP network, according to an exemplary embodiment of the present invention.

FIG. 1 shows a service controller within an IP network, according to an exemplary embodiment of the present invention. A subscriber can access network based communications, information and entertainment content ("services") through a multiplicity of devices 101-103. Mobile phone 101 (which may be mobile, cellular or satellite), personal computer (PC) 102, and IPTV 103 are connected to a packet-based network like an IP network 190. Also connected to network 190 is a service controller 120. Service controller 120 comprises a logic unit, and a plurality of sub-controllers 121-123. Each sub-controller has a data store 125. Additionally, service controller 120 has a data store 126. Service controller 120 is also in communication with an Intelligent Information Collection Repository (IICR) 130. IICR 130 comprises a logic unit as well as a plurality of databases 132. These network elements may comprise either hardware, computer programs, or any combination of both. "Controller", "Manager", or "logic unit" likewise comprises a preprogrammed hardware unit, software, or a combination of both. Communication between network elements and logic units may include the session initiation protocol (SIP), as well as any equivalent packet-based signaling and/or transport protocols. SIP allows for a finer level of granularity in regards to the devices and their capabilities.

A multitude of services are available to the subscriber. "Services" include voice, data, applications, etc. A service that is an application may be hosted by an application server. Services can also include data services such as web browsing, FTP, Instant Messaging (IM). Furthermore, a service may include access to particular network or transport protocols and elements, such as EVDO, SIP, etc. Services are provided by a "service provider." Service providers may be the network operators, or alternatively they may be third parties that contract with the network operator to be able to host their services on the network operator's network.

The process by which a subscriber enables access to a service is called "provisioning." The subscriber requests a service to be added. The request is handled by a provisioning mediator, such as service controller 120. One method of provisioning a service is manually, for instance via mobile phone 101. Provisioning may also be performed via a separate device such as computer 102, or even directly by the network operator. A plurality of existing methods to enable a service will be known to one in the art.

The subscriber accesses provisioned services via a device 101-103. "Device" comprises any combination of mobile phones, personal computers, PDAs, or any equivalent device that is capable of wired or wireless communication over a packet-based network. For instance, subscriber 101 may surf the internet via a data connection on his mobile phone, or by tethering his mobile phone to his laptop computer, thus using the phone as a modem. "Device" also includes IP-enabled devices such as IPTVs, IP Radio, etc. Furthermore, the subscriber may access a multitude of services, including applications, multimedia, and associated network-level services and protocols. For instance, a subscriber may access an online banking application hosted by an application server (not shown), as well as utilize a data-layer protocol to watch video over IPTV.

Different services have varying levels of service. The "level of service", "service level or "performance level" can comprise the quality, scope, and accessibility of the service but is not limited to these aspects. An example of quality could be voice quality; i.e. a subscriber may require a 16-bit high quality digital voice connection for videoconferencing purposes while another subscriber may only require an 8-bit connection for basic VoIP communication. Unlimited text messaging vs. a limited plan is an example of scope. The ability of a subscriber or a device to access certain applications or media resources is an example of accessibility.

Subscribers typically pick and choose services based on their needs, then pay or are billed for these services. The agreed-upon level of service for a particular service is called a Service Level Agreement (SLA). SLAs are key to performance criteria of applications and services on the network. Customers have expectations based on a certain level of performance for individual services as well as combined and interactive services. For instance, in a communications service such as voice or video, there is an expectation for continuous use with minimal disruption of service. These services can be characterized as real-time and near real-time. Other services such as messaging may function with a certain amount of latency with no significant impact to the customer expectation. Thus there can be numerous levels of SLAs for a particular service, each level corresponding to a different level of service. In addition, all of the various SLA agreements for the different services provide by the network operator comprise a subscriber SLA. SLA's may be stored on a database such as IICR 130, or on a separate database on network 190. Based on the subscriber agreement with the network operator or with the service provider, SLAs may be modified by any combination of an application server (not shown), billing server (not shown), or by a provisioning mechanism that is part of service controller 120.

Referring back to FIG. 1, within network 190, there would be many forms of data management specific to all subscribers. Data can come from a subscriber's interaction with the network, with applications on a subscriber's mobile device, or from any other source, and includes but is not limited to usage patterns, purchases via mobile device, billing, web browsing habits, song/video downloads/purchases, subscriber location, subscriber-defined preferences, as well as peak usage dates and times, protocols used, and similar information from other subscribers' profiles or segment profiles. Service controller 120 delegates collection of certain types of information to the sub-controllers 121-123.

Thus, in one exemplary embodiment, sub-controller 121 is a Content Manager, and would store all information regarding content to each individual subscriber. Content includes multimedia such as ringtones, MP3s, streaming media, e-books, images, etc. Examples of content include user generated content from sources such as MySpace™, FaceBook™ or YouTube™. It could also be content with Digital Rights Management such as movies or music. The function of the Content Manager is to categorize and file information about all types of content for each subscriber. A subscriber therefore would have a historical association to the types and genre of content he/she accesses. Similarly, sub-controller 122 may be a Communications Manager, and would file and aggregate information about individual subscribers based on their modes and timing of communications. For instance, certain people like to use Instant Messaging as their primary form of communication over Email and sometimes even voice. These differing patterns of communications are captured at the Communications Manager in the network. Sub-controller 123 is a Billing Manager, and holds historical data regarding the purchase of services and applications. When a customer provisions these services and applications, some will have a lifespan that last only a few months and even perhaps a few days. Billing manager 123 stores this information off for later correlation of services to optimize the wallet share of the subscriber. For instance, subscriber may have provisioned a monthly spending limit on his account in terms of services. Alternatively, service controller 120 may notice a certain steady trend in the ARPU for the subscriber over a period of time. In either case, if an application or service is unused for an extended period of time or has expired, data from billing manager 123 is appended to subscriber profile 132, and invokes service controller 120 to de-provision that service. Furthermore, when service controller does recommend a service to the subscriber, it may first check billing manager 123 or user profile 132 to determine if any rules or trends exist. Thus billing manager 123 allows a network operator as well as a subscriber to fine-tune the service levels using financial constraints.

In a mass market where hundreds of millions of subscribers produce billions of transactions per day, historical data can become quite unwieldy. Thus each of the predefined network elements needs a place to dump data periodically. Content Manager 121, Communications Manager 122 and Billing Manager 123 all send their data on a predefined short term interval to service controller 120, to be stored in database 126. Database 126 consolidates the information on a per subscriber basis and dumps the consolidated information to IICR 130. IICR 130 holds all historical data from service controller 120 and correlates it in real-time with other information such as market demographics and network service/applications analytics. IICR 130 stores the combined data in a subscriber profile. The subscriber may be part of one or more segments of subscribers or "segmentation layers," within the IICR. A segmentation layer would be formed of multiple subscribers that have one or more correlations between their usage patterns, services used, billing, demographics, etc. For instance, subscribers that were above the age of 60 and had services that allowed for access to bank and investment information would constitute a segmentation layer of subscribers. Another segmentation layer would be subscribers that have broad band service and downloads music. A more discrete segmentation layer could potentially comprise subscribers that live in Reston, Va. and commute to Washington, D.C. between 7 am and 9 am. An even more discrete segmentation layer could comprise the above commuters, but only those who own PocketPC™ devices and have unlimited-data plans.

Using the segmented and correlated information in subscriber profiles 132, service controller 120 seeks patterns in a subscriber's usage of a service. Based on these patterns, service controller 120 can predict what services the subscriber may access or need access to, immediately or in the future. For instance, a subscriber's profile 132 may indicate that the subscriber accesses a particular application via his device 101-103 at a specific time every day. Using this information, service controller may offer to automate some of the tasks performed by the subscriber in using the application. The service controller may also determine that a related application may be relevant to the subscriber. This application may be "pushed" to the subscriber, or provisioned to the subscriber's account. The subscriber may be provided with a confirmation request to provision the service. Similarly, a subscriber may be regularly billed for a service that he has not used in months. The service controller recognizes this pattern, and may offer the subscriber to "de-provision" the service. In this way, the service controller is able to dynamically mold a subscriber's services and applications by tweaking the subscriber's SLA in real-time, based on the subscriber's usage.

The service controller may also correlate these patterns with usage patterns in a segment profile. Based on this correlation, the service controller is able to determine relevant content for a subscriber based on the usage patterns of the segment. As mentioned herein, IICR 130 contains usage records of subscribers, as well as groups of subscribers known as segments. Patterns in these usage records may be applied to determine whether or not a certain subscriber or segment has a need for a particular application. For instance, If subscriber drives daily from Fredericksburg, Va. to Alexandria, Va., while listening to internet radio in his car, this information will be in IICR 130. Service Controller 120 recognizes this pattern, and looks for other services that could be added to the subscriber account based on information from IICR 130. For instance, service controller 120 may decide that services such as mapping, traffic reports, or weather reports in the local area are optimal for the subscriber. The provisioning mechanism upgrades the subscriber's account by adding an SLA related to traffic or weather reports. The upgrade could comprise a modification to the existing Internet Radio SLA to deliver extra channels to the subscriber's device. This could be an example of scope of service. Alternatively the provisioning mechanism could "push" to subscriber 101 a series of options relating to weather and traffic reports for the area. Subscriber 101 could view this "grocery list" of options and pick one that he or she likes. The service is then automatically provisioned and the subscriber sits back and enjoys his new information.

Figure 2:
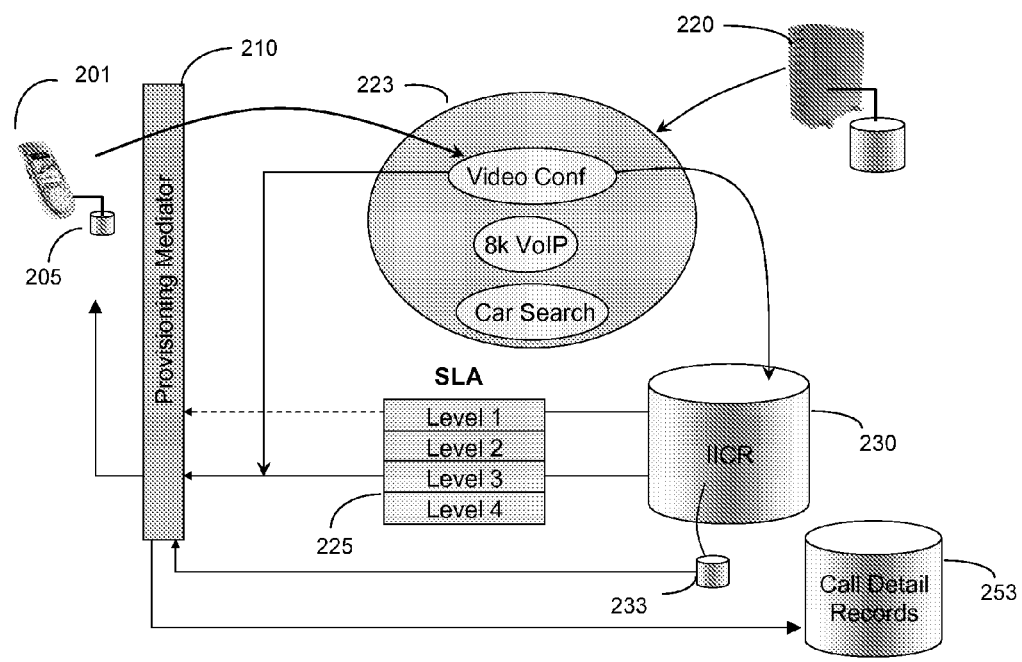
FIG. 2 shows a method for provisioning, according to an exemplary embodiment of the present invention.

FIG. 2 shows a method for provisioning, according to an exemplary embodiment of the present invention. Device 201 is in communication with provisioning mediator 210. Provisioning mediator 210 contains a Service Controller that is in communication with a plurality of application servers 220 and IICR 240. Application servers 220 host applications or services 223. Furthermore, each subscriber to a service has an expectation for scope of service and QoS, which are stored in the form of service level agreements (SLA) 225. IICR 240 stores a number of profiles 243 for individual subscribers that are generated using data monitored and stored in the a Call Detail Records (CDR) database 253 that may be part of the Communications Manager in FIG. 1

Subscriber 201 makes a "call" or request for a specific application/service 225 to be enabled or provisioned. In this case, the application is Video Conferencing. The application request is registered with the network via provision mediator 210. Provisioning mediator checks for security access and billing plan with a billing server (not shown). Provisioning mediator 210 then forwards the request onto the services access environment 223. In this environment services/applications 223 are housed which have been pre-certified for usage on the network. These services may be provided by the network operator or by a third party, as described earlier. Application servers 220 are invoked when a request is made from an active subscriber 201 having passed security and billing permissions. If the application is available on an application server, a request is made to IICR 240 for subscriber profile information. If no subscriber profile information is available, a default SLA 225 is set (Level 1) based on the application developer's recommendations for usage. In the present scenario, subscriber 201 (James) does have profile information in IICR 240, either regarding the specific service, in this case Videoconferencing, or regarding related services such as device type and bandwidth usage. Thus, there also exists a corresponding SLA 225 based on James' past usage. Level 3 of SLA 225 is more cost efficient for James as it requires less QoS and associated secured bandwidth, and seems to have been effective for him in the past. Furthermore, James may have stipulated or provisioned a financial rule in the billing manager that sets the QoS to an optimal level for under $50/month. Logic within provisioning mediator 210 uses the data available via IICR 240, James' profile, and grants James access to the videoconferencing application via the Level 3 SLA. The combination is provisioned for use on James' device. An appropriate billing record of the event may also sent to a Billing Controller as shown in FIG. 1 after the provisioning is verified and usage begins.

In order to provide full customization of applications/services a hierarchical approach must be used which includes the ability to automatically recognize communities of subscribers or "segmentation layers" within an IICR and update SLAs accordingly. Using profiling and feedback loops from subscribers, this system will enable real-time provisioning and support for services aligned with the current needs of the subscribers or communities/segments. For instance, James may have use for a collaborative mobile video whiteboard application in order to communicate in a business environment while on business travel. However, this business travel occurs once every six months. The voice quality connection, video fidelity and access to whiteboarding tools may be critical for James at that particular time which requires the highest level of SLA for videoconferencing. For this event, service controller/provisioning mediator will update James' SLA to allocate the associated bandwidth and latency requirements, correlate the quality of service (QoS) and define a "locked down" SLA for a block of time. The mechanism will also have the capability of allowing access to the mobile video and collaboration features for a limited time and then de-provision the service seamlessly once James' requirement is satisfied and the IICR is updated with a new state change. Furthermore, James' interaction with this provisioning and de-provisioning can be a test case for the entire segmentation group. If James accepts the new billing structure for his services, then this billing structure will be pushed to the rest of the subscribers in that segment.

Combining usage, quality, and billing patterns within an IICR with SLAs and actual performance yields a higher level of subscriber experience and flexibility. A subscriber may decide for instance that a lower level of quality (i.e. 8 k voice) is sufficient for family communication as long as the call does not degrade beyond this quality and is not dropped. For this concession, the subscriber may be willing to opt into a provisioning arrangement for lower quality of service (QoS) calls for family members. This plan can be priced lower than for a higher voice quality when in voice calls with business colleagues. The subscriber's SLA is updated based on time of day, subscriber preferences, "state change" within the IICR, subscriber location, and any number of relevant factors described herein and evident to one skilled in the art. Because the business-level service/application set is of such great importance to the subscriber, a premium charging scheme can be allocated for this specific block of time. After the call/video session is completed, the SLA is "torn down" and a more typical or normal SLA is invoked for the same customer.

Figure 3:
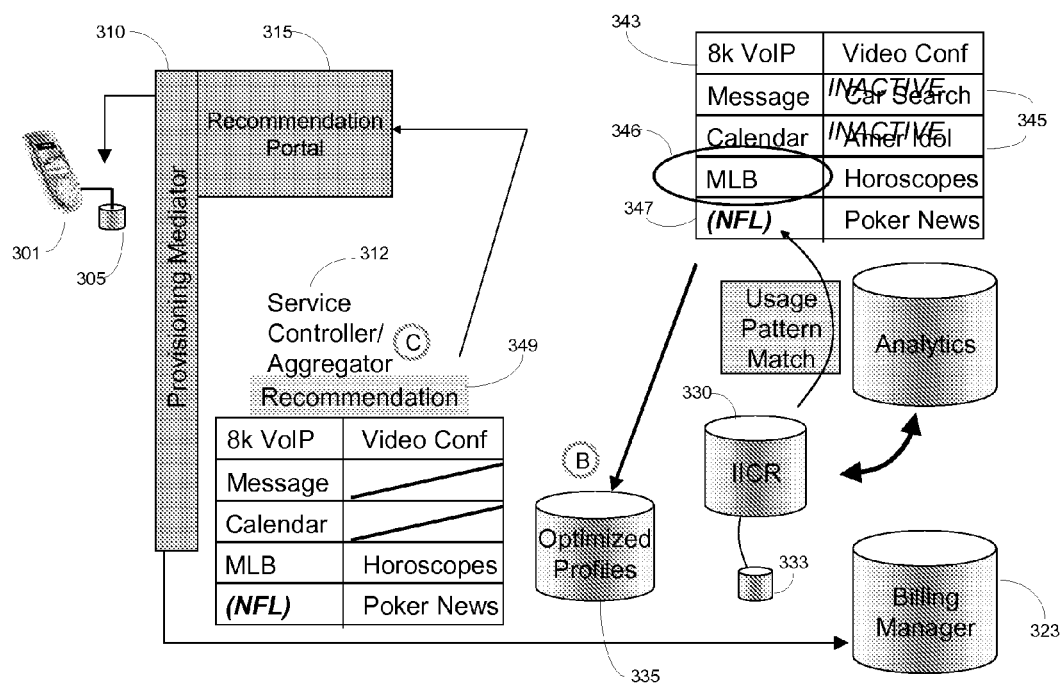
FIG. 3 shows an intelligent charging mechanism according to an exemplary embodiment of the present invention.

FIG. 3 shows an intelligent charging mechanism according to an exemplary embodiment of the present invention. Subscriber device 301 communicates with provisioning mediator 310 equipped with a Service Controller 312 and a recommendation portal 315. IICR 330 stores patterns of usage for subscriber 301 in database 333. Additionally, M-IICR 305 on device 301 collects and uploads local data regarding usage, state change, and other information at the user end. Data collection is performed en masse for all subscribers in the network via IICR 330.

In the present embodiment, Service Controller 312 has collected information from the Content and Communications Managers and has a record of currently used services 343. Note that two services 345 have registered inactive for the prescribed interval. In this case the applications "Car Search" and "American Idol" have not been accessed during this billing period but remain on the "active" list of applications for which the subscriber is being billed. A new application/service (Major League Baseball—MLB) 346 has also been launched during this cycle. One other application/service (National Football League—NFL) 347 was registered as ACTIVE last year at this same time but does not currently show up on the ACTIVE Service Usage database in IICR 330

Based on the historical revenue generated by subscriber 301, a new line up of applications/services is created for recommendation. In this case, for instance, subscriber 301 pays on average $57 per month for service. Not only is this billing cost in subscriber profile 333 and in the billing system, it may also be monitored in real-time and be added to a segment within IICR 330. However, because Major League Baseball 346 has been added and he is still being charged for the usage of two INACTIVE services (Car Search and American Idol) 345, the bill for next month's usage is predicted to be in excess of $70. Subscriber 301 is being billed for applications he does not use and is about to see a substantial increase in his upcoming bill based on the addition of another application. However, because of the Intelligent Charging system, subscriber 301 is offered a recommendation based on his historical profile of Average Revenue Per Month (ARPU) and services he is using or has used in the past. A "recommendations" page 349 is sent to subscriber 301, outlining a potential billing plan that will maintain his ARPU and optimize his usage. The recommendation is to discard the "Car Search" and "American Idol" applications and add "NFL" in their place. This results in an overall bill (for the current cycle) or $59 per month instead of the $70 rate. The subscriber has the option to either act on the recommendation, leave the applications/services as is or to modify it further. This final submission is sent back to Billing Manager 323 in order to affect the next billing cycle and store the new Service Usage records.

As discussed elsewhere, services may be provided by the network operator or by a third party service provider who has contracted with the network operator to provide services on the network. In one exemplary embodiment of the present invention, a subscriber may be offered services from a third-party provider based on information present in the subscriber's profile or in the segment profile. For instance, an IICR on a network reports that a large segment of the subscriber population frequents a local branch of a nationwide chain restaurant every NFL Sunday, during football season. Previous embodiments disclosed multiple ways that this information could be useful to network operators, service providers, and application developers. However, it is also possible for the network operator to leverage this segment information with the nationwide chain. For instance, the network operator may have a powerful advertising engine in their back-end. Given the knowledge that 50 million subscribers nationwide frequent Rock Bottom Café every NFL Sunday during football season, the network operator is in the position to bargain with Rock Bottom Café to provide services to their subscribers. If Rock Bottom Café pays the mobile operator to advertise via their service, the operator can directly target this 50 million subscriber segment with relevant offers and services. For instance, Rock Bottom Café might want to distribute an electronic coupon for 20% off dinner and drinks during a playoffs game. They would gladly pay the mobile operator for this tremendous advertising opportunity, and at the same time, 50 million subscribers are elated that they received a 20% off coupon.

In one exemplary embodiment of the present invention, the Service Controller monitors QoS delivered versus QoS as provided in the SLA. As mentioned herein, SLAs are key to performance criteria of applications and services on the network. SLAs contain records relating to customer's expectations of service level and quality of service (QoS). Additionally, records of QoS and service levels as delivered, along with network conditions and other information, is also stored either within IICR or generated by MIICR on the subscriber's device and feedback from an application server. When a service or application is accessed by devices 101-103, a data link may be established between the device and an application server. As described herein, this data link is susceptible to variances in quality and scope. QoS is monitored by the application server or by M-IICR 105 on devices 101-103, and patterns of QoS are stored in the related SLA. For instance, the subscriber may have a data plan, and may have provisioned his account to receive daily video news feeds on his device. However, the quality of the video delivered 5 days out of 10 is lower than expected. The record of the actual quality and scope of the service is recorded in the SLA database along with subscriber's actual preference for the material. Thus, it is possible to compare expected service levels with actual service levels, and correct for any errors or deficiencies before the subscriber has a chance to review his billing statement and become disgruntled. In fact, since the QoS is compared to the SLA in real-time and the Billing Controller is updated immediately, there may be no incorrect billing at all. Subscribers are billed for the quality and level of service they receive, such that revenue generated is consistent with services used.

In another exemplary embodiment, the present invention can be used to control unauthorized use of resources on the network. For instance, many subscribers with data plans are able to connect or "tether" their mobile devices to their computers, and use the data plan to access the Internet from the computer. However, tethering consumes large amounts of bandwidth on the network. Thus, subscribers who wish to tether their devices are typically required to provision and pay for a tethering plan. Typically, such blatant misuse results in the subscriber being disconnected from the network and/or banned. The subscriber remains unsatisfied and disgruntled, while the network operator is lamenting the loss of one ARPU unit.

With the knowledge and patterns of usage detected by the present invention, such usage can be monitored, and appropriate action can be taken without the involvement of management or account representatives. For instance, if 20 out of 10,000 data users are unlawfully tethering their devices and using a large chunk of bandwidth, the automatic provisioning/billing system described herein can simply prompt the user with an offer to purchase a broadband card/LAN card or a tethering plan for a subsidized rate. If the customer denies the offer and continues to tether, further action may be taken. However, it is an objective of the present invention to maintain high customer satisfaction by providing them with a plethora of options, while maintaining a steady ARPU income stream.

Thus, by offering customized charging models for particular subscribers and segmentation groups based on their usage patterns, network operators can offer more lucrative services that can be provisioned in a flexible manner. The inclusion of a plurality of databases to store different patterns of usage and consolidate them into an IICR is what makes this possible. Furthermore, the process is automated and requires minimal intervention from marketing departments, and minimal manual "pushing" by product managers, etc. In addition, the connection of intelligent provisioning and charging with other areas like billing and QoS assures a high level of subscriber satisfaction while maintaining revenues from subscribers purchasing new services.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A network system for intelligent provisioning and charging, the network system comprising:
   a Service Controller configured to:
      aggregate a plurality of raw data,
      determine usage patterns of a first service by a device on the network; and
      record the usage patterns on a central database;
   a Billing Manager within the Service Controller configured to bill the subscriber based on the usage patterns;
   an Intelligent Information Collection Repository (IICR) configured to correlate the usage patterns of the first service with a plurality of market demographics and network analytics;
   a logic unit within the Service Controller configured to:
      determine a usage pattern for a subscriber using the first service by a Service Controller on a network;
      record the usage pattern in a subscriber profile on the central database on the network in communication with an application server;
      receive local data regarding subscriber-end information from a Micro Intelligent Information Collection Repository (MIICR) within the device, the MIICR configured to collect and upload local data regarding subscriber-end information, the subscriber-end information including state change information and usage information;
      store the subscriber-end information in the subscriber profile;
      direct the billing manager to charge the subscriber for the first service based on the usage pattern and subscriber-end information; and
      provision a second service for the subscriber by correlating the usage data with the purchasing and charging data;
   wherein the second service is provisioned pursuant to a plurality of billing rules stored in a user profile, said plurality of billing rules including at least a spending limit for the subscriber.

2. The network system of claim 1, wherein the Service Controller further comprises:
   a Content Manager;
   a Communications Manager; and
   a plurality of databases to store the raw data used to generate the usage patterns.

3. The network system of claim 1, wherein communication between devices, logic units, and network elements is facilitated by a Session Initiation Protocol.

4. A network system for intelligent provisioning and charging, comprising:
   a Service Controller configured to aggregate a plurality of usage data for a subscriber and to record the usage data on a central database;
   an Intelligent Information Collection Repository (IICR) in communication with the Service Controller, the IICR configured to correlate the usage data with market demographics, network analytics, and other information about the subscriber;
   a Billing Manager within the Service Controller configured to aggregate a plurality of purchasing and charging data for a subscriber; and
   a logic unit within the Service Controller configured to:
      determine a usage pattern for a subscriber using a service by a Service Controller on a network;
      record the usage pattern in a subscriber profile on the central database on the network in communication with an application server;
      receive local data regarding subscriber-end information from a Micro Intelligent Information Collection Repository (MIICR) within a device on the network, the MIICR configured to collect and upload local data regarding subscriber-end information, the subscriber-end information including state change information and usage information;
      store the subscriber-end information in the subscriber profile;
      direct the billing manager to charge the subscriber for the service based on the usage pattern and subscriber-end information; and
      provision a service for the subscriber by correlating the usage data with the purchasing and charging data;
   wherein the service is provisioned or de-provisioned pursuant to a plurality of billing rules stored in a subscriber profile, said plurality of billing rules including at least a spending limit for the subscriber.

5. The network system of claim 4, further comprising:
   a Communications Manager within the Service Controller configured to aggregate a plurality of communications-related data for a subscriber; and
   a Content Manager within the Service Controller configured to aggregate a plurality of content and multimedia-related data for a subscriber.

6. The network system of claim 4, wherein communication between network elements and devices is facilitated by a Session Initiation Protocol.

7. A method for intelligent provisioning and charging, the method comprising:
   determining a usage pattern for a subscriber using a service by a Service Controller on a network;
   recording the usage pattern in a subscriber profile on a database on the network in communication with an application server;
   receiving local data regarding subscriber-end information from the device on the network, the subscriber-end information sent from a Micro Intelligent Information Collection Repository (MIICR) on the device, the MIICR configured to collect and upload local data regarding subscriber-end information, the subscriber-end information including state change information and usage information;
   storing the subscriber-end information in the subscriber profile;
   directing a billing server to charge the subscriber for the service based on the usage pattern and subscriber-end information;
   correlating the usage pattern and subscriber-end information with a plurality of market demographics and network analytics; and
   provisioning a second service for the subscriber based on the usage pattern and subscriber-end information, wherein the second service is provisioned pursuant to a plurality of billing rules stored in the subscriber profile, said plurality of billing rules including at least a spending limit for the subscriber.

8. The method of claim 7, further comprising:
   aggregating usage data for the subscriber by using the Service Controller;
      wherein the Service Controller includes a plurality of sub-controllers and a plurality of databases.

9. The method of claim 8, further comprising:
   combining the usage data along with a plurality of demographics for the subscriber and adding the combined usage data and the plurality of demographics to the subscriber profile.

10. The method of claim 9, wherein the subscriber profile is created and stored within an Intelligent Information Collection Repository.

11. The method of claim 10, wherein the subscriber profile is linked to a segmentation layer within the Intelligent Information Collection Repository.

\* \* \* \* \*